United States Patent [19]
Jamieson

[11] 3,815,001
[45] June 4, 1974

[54] SILICON CONTROLLED RECTIFIER MOTOR SPEED CONTROLLER

[75] Inventor: Joseph Jamieson, Plantation, Fla.

[73] Assignee: Louis W. Parker, Ft. Lauderdale, Fla.

[22] Filed: Mar. 13, 1973

[21] Appl. No.: 340,853

[52] U.S. Cl.................. 318/139, 318/305, 318/416
[51] Int. Cl. ............................................ H02p 5/16
[58] Field of Search .......... 318/139, 305, 416, 420, 318/421, 422

[56] References Cited
UNITED STATES PATENTS
3,390,318   6/1968   Gilbert.............................. 318/422
3,628,621   12/1971   Lee................................... 318/139

*Primary Examiner*—Bernard A. Gilheany
*Assistant Examiner*—Thomas Langer
*Attorney, Agent, or Firm*—Elliot I. Pollock

[57] ABSTRACT

An electric motor, for driving an automotive vehicle, has its speed and torque controlled by variable impedance means connected to control the armature current in the motor. The impedance means comprises a plurality of series-connected resistors and silicon controlled rectifiers, connected in a parallel array, with the resistors having different values respectively; and different ones of the rectifiers are rendered conductive to place different values of resistance in series with the motor armature circuit. Commutating capacitors interconnect the anodes of the rectifiers to turn off each rectifier when a next successive rectifier in the array is rendered conductive. The last rectifier in the array has no significant resistance in series therewith; and this rectifier is associated with a further capacitor which is in turn associated with two further silicon controlled rectifiers, one of which is rendered selectively conductive to charge the capacitor at a proper stage of the operation, and the other of which is subsequently rendered conductive to discharge the capacitor when it is desired to turn off the last rectifier in the array.

15 Claims, 1 Drawing Figure

Speed Control Switch

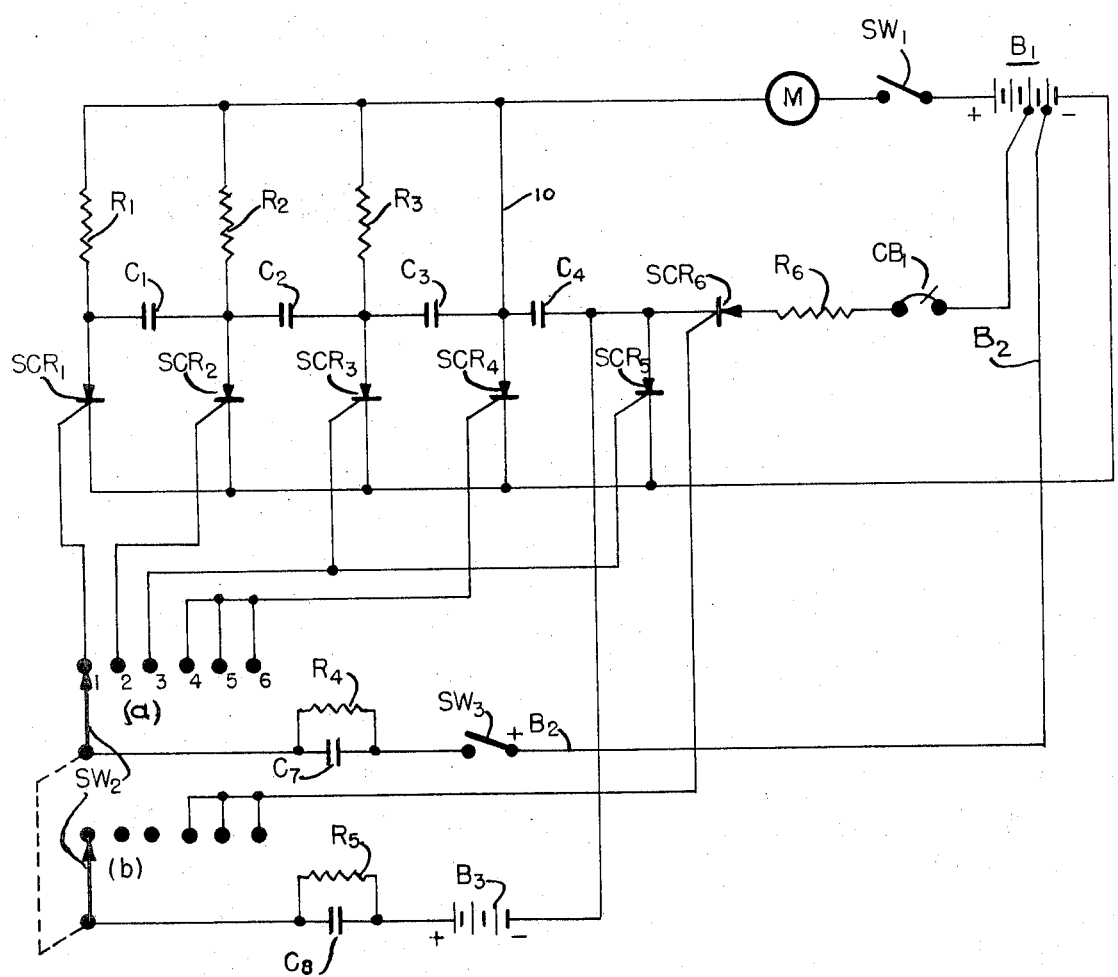

SILICON CONTROLLED RECTIFIER MOTOR SPEED CONTROLLER

BACKGROUND OF THE INVENTION

The present invention is concerned with a sparkless speed control operative to control the amount of current or voltage which is applied to a motor used, for example, as the driving motor in an electric vehicle, thereby to permit the motor speed and/or torque to be controlled; and is more particularly concerned with a unit of the type described which employs a plurality of silicon controlled rectifiers in a circuit arrangement which is simpler in construction, and more versatile in operation, than speed control circuits suggested heretofore.

Motor control arrangements employing silicon controlled rectifier circuits of various configurations have been suggested heretofore. Some arrangements of this type are described, for example, in Lee U.S. Pat. No. 3,628,621, Laas U.S. Pat. No. 3,536,969, Gilbert U.S. Pat. No. 3,390,318, Koppelmann et al. U.S. Pat. No. 3,388,306, Torii U.S. Pat. Nos. 3,341,759 and 3,299,347, and Knapp U.S. Pat. No. 3,185,910. Some of these prior arrangements are intended to supply a motor speed control wherein resistors are selectively inserted in series, for example, with the field or stator windings of a motor; but in general the arrangements suggested heretofore have exhibited a number of operational limitations which prevent the circuit from finding practical use in various applications, e.g., to drive an automotive vehicle.

For example, some of the prior arrangements rely upon a bistable type of control, and are accordingly limited to two control steps which, in most cases, is insufficient to provide the gradations in control required to drive a vehicle. Other arrangements include control networks which depend entirely upon automatic operation, and which do not lend themselves to the type of manual control (i.e., pedal-operated speed variations) which are necessary in an automotive vehicle. Still other arrangements employ electrical contactors which draw comparatively heavy currents, and the resultant sparking severely limits the life of the control arrangement and imposes severe maintenance problems. The prior art arrangements have, moreover, customarily been such that control can be effected only in accordance with a predetermined succession of steps which must be conducted in a proper and predetermined sequence; and the arrangement does not permit variations in this sequence, or modifications of the sequence, whereby the resultant device has insufficient versatility for use in the application contemplated herein.

The present invention, recognizing these problems in the prior art, is concerned with an improved electric motor speed control, of the silicon controlled rectifier type, which is far simpler in construction and more versatile in operation than arrangements suggested heretofore.

SUMMARY OF THE INVENTION

In accordance with the present invention, an electric motor speed control comprises an electric motor which is provided with a variable impedance network in series with its armature circuit, adapted to permit an operator to vary the armature current in the motor thereby to control its speed and torque. The variable impedance network comprises a plurality of resistors which are connected in series with a plurality of silicon controlled rectifiers respectively, and the various series connected resistors and rectifiers are in turn connected in a parallel array with one another. The resistors have successively decreasing parameter values respectively from one side to the other of the array, with the resistance in series with a last-one of the silicon controlled rectifiers in said array having a parameter value of substantially zero; and a switch arrangement, which may be operated by a foot pedal in a vehicle, is provided to render different ones of the rectifiers conductive thereby to insert different values of resistance in series with the motor armature circuit so as to effect a variation in the motor speed and/or torque.

The variable impedance network is so arranged that the silicon controlled rectifiers in the array can be turned on individually, with the next adjacent previously conductive rectifier in the array being substantially simultaneously turned off, in ascending or descending order starting at any point in the sequence of rectifiers being gated, without the necessity at any time of having to open a mechanical contactor with its attendant arcing. This operation is partially accomplished by means of a plurality of commutating capacitors which are interconnected from one to the next of the anodes of the rectifiers in the array, with said capacitors being so arranged that, when one of the rectifiers is rendered conductive, a particular one of the capacitors simultaneously acquires a charge of predetermined polarity thereon, and when the next adjacent one of the rectifiers is rendered conductive the capacitor is discharged to turn off the previously conducting one of the rectifiers. This commutating capacitor operation cannot, however, achieve a turn-off of the last one of the rectifiers in the array (which has no significant resistance in series therewith); and a separate turn-off circuit, which is rendered operable at proper times during the speed control operation, is used to provide positive turn-off of said last rectifier in the array.

The separate turn-off circuit comprises a further capacitor which has one side thereof connected to the anode of the last rectifier in the array, with the other side of said further capacitor being associated with two additional silicon controlled rectifiers. One of the additional rectifiers is rendered conductive to charge the further capacitor when the last silicon controlled rectifier in the array is rendered conductive; and thereafter, when it is desired to turn-off the said last rectifier in the array, the other additional silicon controlled rectifier is rendered conductive to discharge the capacitor in the inverse direction through said last rectifier in the array. The additional turn-off circuit, in association with the aforementioned commutating capacitors, accordingly assures that any conducting one of the silicon controlled rectifiers in the array is turned off when the control is stepped to a next successive one of the rectifier in either an ascending or descending direction.

BRIEF DESCRIPTION OF THE DRAWINGS

The single FIGURE in the drawings depicts a preferred embodiment of the present invention.

DESCRIPTION OF THE PREFERRED EMBODIMENTS

The drawing illustrates a sparkless speed control for a DC motor, e.g., of the type employed in an automotive electric vehicle, and is operative to control the amount of current or voltage which is applied to the motor employed. As will appear hereinafter, the control unit comprises a controllably variable impedance which is connected between a direct current source (such as the battery of the vehicle) and the direct current motor, e.g., its armature circuit; or, alternatively, the control unit can be connected between a adirect current source and the inverter of a "brushless" direct current motor or variable frequency alternating current motor.

Speed control is accomplished by varying the current through or voltage across the motor, and this variation is in turn effected by the switching of increments of resistance between the direct current source and motor. The switching action is effected by bringing silicon controlled rectifiers (hereinafter referred to as SCR's) into conduction. Individual SCR's are connected electrically in series with each increment of resistance. The sequence of bringing SCR's into conduction is controlled by a small selector switch, which may be moved manually or otherwise under operator control, e.g., by a foot pedal in the vehicle, or which may be caused to rotate or move by means of a driving force derived from an appropriate electro-mechanical device such as another motor or stepper switch.

More particularly, referring to the drawing, a motor M has one side of its armature circuit connected via a manually operable switch SW1 to one side of a DC power source such as a battery $B_1$. The other side of the motor armature circuit is connected to the other side of battery $B_1$ via a controllable variable impedance comprising a plurality of different impedances which can be selectively inserted in series with motor M to vary the armature current of that motor.

The particular arrangement shown in the drawings includes provision for inserting any one of four different resistance values in series with motor M, and accordingly provides a four-step speed and/or torque control. One increment of resistance is provided by resistor $R_1$ which is in series with SCR$_1$; a second increment is provided by resistor $R_2$ in series with SCR$_2$; a third increment is provided by resistor $R_3$ in series with SCR$_3$; and a fourth increment is provided by wire connection 10 (which has a resistance value of substantially zero) in series with SCR 4. The resistance values of $R_1$, $R_2$, $R_3$ and connection 10 differ from one another with $R_1$ exhibiting the greatest resistance, $R_2$ exhibiting a lesser resistance, and $R_3$ exhibiting a still lesser resistance.

The upper ends of the various resistance increments are connected to one another and to one side of the motor armature circuit. The cathodes of SCR1–SCR4 are similarly connected to one another and, via battery $B_1$, to the other side of the motor armature circuit. The various series connected resistors and associated silicon controlled rectifiers are, accordingly, connected in a parallel array which is in turn connected in series with the motor armature circuit whereby a particular one of several different increments of resistance can be placed in series with the motor armature circuit simply by rendering its associated SCR conductive.

Commutating capacitors $C_1$, $C_2$, and $C_3$ are connected between the anodes of SCR1–SCR4 as illustrated to provide forcible turn-off of a conducting SCR when such turn-off is required. This operation will be described subsequently.

Control is effected by means of a manually operable switch SW2 comprising two switch arms which are adapted to engage plural contacts respectively in two decks ($a$) and ($b$) of the switch. Six contacts, 1–6 inclusive, are provided in each deck; and contacts 1–4 inclusive of upper deck ($a$) are connected respectively to the gate electrodes of silicon controlled rectifiers SCR1–SCR4. Contact 3 of the upper deck is, in addition, connected to the gate electrode of a further silicon controlled rectifier SCR5, which comprises a portion of the additional turn-off circuit (associated with SCR4) to be described hereinafter. Contacts 4, 5 and 6 in the upper deck, as well as the corresponding contacts in the lower deck are connected to one another to provide a certain amount of over-travel when the arms of switch SW$_2$ are moved by a foot-operated device. Alternatively, the operating pressure for SW$_2$ can be communicated to the switch arms by means of a spring, and a lost motion connection or mechanical stop can then be provided to limit the wiper contact motion of the switch arms in SW$_2$.

When the upper arm of SW$_2$ is in contact with any selected one of the contacts in deck ($a$), an energization signal is supplied to the gate electrode of the silicon controlled rectifier which is connected to that contact. The energization signal is derived from a tap $B_2$ on battery $B_1$, which is connected via a further manually operable switch SW$_3$ to a parallel RC combination comprising resistor $R_4$ and capacitor $C_7$, and thence to the upper switch arm. The RC combination, $R_4C_7$ is provided to produce a pulse of SCR gating energy, which decays in time so as to avoid damage to an SCR, when the switch arm first engages a particular one of the contacts 1–4; and the resistor $R_4$ serves to discharge capacitor $C_7$ during the time interval when the selector switch arm moves from one to the next contact. A voltage of four volts DC and a current of 70 ma are typical of the maximum gate input requirements for an SCR capable of controlling 50 amperes of controlled current, but it will be appreciated that if the control current is higher this will in turn necessitate a higher gate current.

An additional turn-off circuit, the operation of which will be described hereinafter, is associated with SCR4. This additional circuit comprises a capacitor $C_4$ which has one side connected to the anode of SCR4, and its other side connected to the anode of SCR5 and to the cathode of SCR6. SCR6 is provided to selectively charge $C_4$ and, to that effect, has its anode connected via a current limiting resistor $R_6$ and a circuit breaker CB$_1$ (which acts as a safety device) to a further tap on battery $B_1$. The gate electrode of SCR$_6$ is connected to three interconnected contacts in the lower deck ($b$) of switch SW$_2$, which correspond in position to contacts 4–6 of the upper deck; and the lower switch arm of said switch SW$_2$ is connected via a pulsing network $R_5$ $C_8$ (which is structurally and operationally similar to the network $R_4$ $C_7$) to a further DC source $B_3$.

SCR$_5$ provides a discharge path for capacitor $C_4$, in an inverse direction through SCR$_4$, when it is desired to turn-off SCR4 and, to that effect, the cathode of SCR5 is connected to the cathode of SCR4. The gate electrode of SCR5 is connected to contact 3 in the upper deck ($a$) of switch SW$_2$ so that SCR5 is rendered conductive coincident with the conduction of SCR3, i.e., coincident with the conduction of the silicon controlled rectifier next preceding the last rectifier SCR4 in the variable impedance array.

Turning now to the operation of the circuit, let us initially assume that all of capacitors $C_1$–$C_4$, $C_7$ and $C_8$ are in a discharged condition, and that switches $SW_1$, $SW_3$, and $CB_1$ are all open. Let us further assume that the switch arms of $SW_2$ are in contact with the first contact, i.e., contact 1, in both the upper and lower decks of the switch.

To start the operation, switches $SW_1$, $SW_3$, and $CB_1$ are closed. Since the lower switch arm of $SW_2$ engages an open contact (and the same is true for each of the first three positions in the lower deck) nothing occurs at this point in time at the lower deck. However a gating signal is coupled from tap $B_2$ of te main battery $B_1$, via switch $SW_3$ and the parallel combination of $R_4$ and $C_7$, to the upper switch arm of switch $SW_2$ and thence, via contact 1 in upper deck ($a$) to the gating electrode of $SCR_1$. $SCR_1$ is accordingly forced into conduction and resistor $R_1$ is effectively connected in series with the armature circuit of motor M. The value of resistor $R_1$ is selected to give a small forward torque to the motor and, when the arrangement is employed to drive a vehicle, achieves a motor torque equivalent to that needed when the vehicle is stopped in traffic.

When $SCR_1$ conducts, a charging current also flows to capacitor $C_1$ via resistor $R_2$. Capacitor $C_1$ accordingly becomes charged to a potential which is equal to the full voltage of battery $B_1$, less the $SCR_1$ anode to cathode voltage drop (approximately one volt) plus the IR drop across motor M and the motor back EMF potential (which is proportional to the motor speed). The charge acquired by capacitor $C_1$ at this time exhibits a negative potential at the anode of $SCR_1$ and a positive potential at the anode of $SCR_2$.

If it should now be desired to increase the speed of motor M, a smaller resistance value $R_2$ is substituted for the resistor $R_1$ in series with said motor. This is accomplished by movement of switch $SW_2$ into engagement with contact 2 of upper deck ($a$) to couple a pulse of gating energy to the gating electrode of $SCR_2$. $SCR_2$ is accordingly rendered conductive to increase the motor current which flows through motor M via resistor $R_2$ and its series rectifier $SCR_2$. Momentarily, the current flow through resistor $R_1$ and $SCR_1$ will continue. However when $SCR_2$ is rendered conductive, capacitor $C_1$ discharges through $SCR_2$ in a forward direction, with the discharge current being then directed through $SCR_1$ in the inverse direction, to take $SCR_1$ out of conduction. This principle of using a commutating capacitor between two SCR anodes, to provide mutually interacting turn-offs, is in itself known in the prior art.

When $SCR_2$ has been rendered conductive, $C_2$ will now be charged by virtue of current flow through resistor $R_3$. The charge across capacitor $C_2$ performs the same function as that previously described with reference to capacitor $C_1$, i.e., if it is desired to increase the motor speed further, the switch arms of $SW_2$ will now be moved into engagement with contact 3 to render $SCR_3$ conductive and, at the same time, capacitor $C_2$ will discharge through $SCR_3$ in a forward direction and thence through $SCR_2$ in the inverse direction to take $SCR_2$ out of conduction. As a result, the smaller value of resistor $R_3$ will be substituted for that of resistor $R_2$ in series with motor M.

If it is desired to bring motor M to its maximum speed, the upper arm of switch $SW_2$ can now be moved into engagement with contact 4 to render $SCR_4$ conductive thereby, in effect, reducing the series resistance to its minimum or to substantially zero value; and conduction of $SCR_4$ will in turn discharge $C_3$ (which had previously been charged, during conduction of SCR3, via connection 10) to turn-off SCR3. Thus by moving switch $SW_2$ in an ascending direction from one to the next of contacts 1–4, successively smaller increments of resistance are inserted in series with the armature circuit of M, and the motor speed is successively increased.

Disregarding for the moment the special considerations which apply to turn-off of $SCR_4$, to be described, it should be noted that the control described above is bidirectional, i.e., when a particular SCR has been rendered conductive to insert a particular resistance increment in series with the motor M, the motor speed can be reduced from that operating point simply by moving the arms of $SW_2$ in a descending direction. More particularly, when $SCR_3$ is conductive, capacitor $C_2$ is again charged (in opposite polarity to that previously described) by virtue of a charging current which flows to $C_2$ via resistor $R_2$. If the upper switch arm of $SW_2$ should now be moved from contact 3 to contact 2, $SCR_2$ will be rendered conductive by the pulse supply to its gating electrode and, at the same time, $C_2$ will be discharged in a forward direction via $SCR_2$ and in an inverse direction through $SCR_3$ to turn off $SCR_3$. The various SCR's are, accordingly, adapted to be turned off in either ascending or descending order starting at any point in the sequence of SCR's being gated.

While turn-off of $SCR_1$, $SCR_2$, and $SCR_3$ is relatively easy, in either an ascending or descending direction, by virtue of the operation of commutating capacitors $C_1$, $C_2$, and $C_3$, the commutating capacitors cannot operate to turn off $SCR_4$, which has no series resistor increment connected to its anode, once $SCR_4$ has been rendered conductive. In the absence of other considerations, therefore, if $SCR_4$ is rendered conductive to achieve the highest possible motor speed, it would never be possible to reduce the motor speed, i.e., direct connection 10 would always be disposed in parallel with resistor $R_3$, or $R_2$, or $R_1$ if one of these latter resistors were selected for control purposes. Accordingly, separate provision must be made to produce turn-off of $SCR_4$, and this is accomplished by means of capacitor $C_4$, and two additional silicon controlled rectifiers $SCR_5$ and $SCR_6$, connected as shown and described previously.

The gating electrode of $SCR_5$ is connected, together with the gating electrode of $SCR_3$ to contact 3 of deck ($a$) and, accordingly, as switch $SW_2$ is moved in an ascending direction, both of rectifiers $SCR_3$ and $SCR_5$ are rendered conductive simultaneously when the switch arm engages contact 3. The conduction of $SCR_5$, as the control is effected in an ascending direction, produces a charge across capacitor $C_4$ which is positive at the anode of $SCR_4$ and negative at the anode of $SCR_5$; but this charge serves no useful purpose and will tend to dissipate over a period of time. More particularly, the conduction of $SCR_5$ coincident with the conduction of $SCR_3$ as the control is moved in an ascending direction is merely incidental to the operation of the additional turn-off circuit, and $SCR_5$ plays its primary role when the speed control is moved in a descending direction, i.e., from contact 4 to contact 3.

When the switch arms of SW2 engage contact 4 in the upper and lower decks, $SCR_4$ is rendered conductive and, at the same time, a signal is applied from battery $B_3$ via combination $R_5$ $C_8$ and the lower deck (b) of $SW_2$ to the gating electrode of $SCR_6$ to render $SCR_6$ conductive. A charging current will now flow to capacitor $C_4$ via the circuit breaker $CB_1$, resistor $R_6$, and $SCR_6$. The charging current to $C_4$ rapidly decays (on the order of 6ms) and, as capacitor $C_4$ becomes charged, $SCR_6$ will go out of conduction. Resistor $R_6$ in series with the anode of $SCR_6$ acts as a current limiting resistor to protect its associated silicon controlled rectifier.

As a result of the foregoing, when $SCR_4$ is rendered conductive to run motor M at its highest speed, capacitor $C_4$ simultaneously acquires a charge which is negative at the anode of $SCR_4$ and positive at the anode of $SCR_5$. When it is desired to reduce the motor speed, $SW_2$ is moved to contact point 3 to apply gating signals to $SCR_3$ and $SCR_5$ simultaneously. The conduction of $SCR_5$ discharges $C_4$ in an inverse direction through $SCR_4$ to turn-off $SCR_4$, while the conduction of $SCR_3$ simultaneously inserts resistor $R_3$ in series with the motor armature circuit in place of direct connection 10. Further reductions in speed can thereafter be effected by moving $SW_2$ to contact point 2 and then to contact point 1 to effect the circuit operations already described. When $SW_2$ is in engagement with contact 1, a small current will continue to flow through motor M via $R_1$ and $SCR_1$ until $SW_1$ is opened.

The circuit described above, and illustrated in the drawings, provides four steps of motor control. It will be apparent to those skilled in the art that additional control steps can be readily achieved, to achieve finer control gradations, simply by adding further series connected resistors and SCR's, associated commutating capacitors, and corresponding additional contact points in $SW_2$. By way of example, in one application of the circuit developed to drive a 2,500 pound automobile, six steps of control were provided with the various resistors being scaled logarithmically from one step to the next, and the resultant circuit was found to provide a good gradation in armature current control, and therefore a good gradation in motor torque, wihhout any evident jerkiness.

Positive turn-off of each SCR is assured, when required. Although $C_4$ is charged via resistor $R_6$, it will be noted that $SCR_5$ is so arranged that it is not in series with $R_6$ or with any other significant resistance, and $C_4$ is accordingly discharged through a substantially direct connection when $SCR_5$ is rendered conductive thereby to supply the highest current available to turn off $SCR_4$. The arrangement of the remaining capacitors $C_1 - C_3$ is, moreover, such that the circuit actually provides increased SCR turn-off energy for high current operating conditions. This is demonstrated by the fact that the turn-off charging voltage across each of the commutating capacitors is equal to the potential of battery $B_1$ less the IR drop across motor M and the motor back EMF. If motor M stops for some reason, which is an extreme load condition, and if at the same time it is desired to change the resistance in series with the motor, then the turn-off capacitor charging voltage available across the relevant commutating capacitor ($C_1$, $C_2$ or $C_3$) will be the $B_1$ potential less the motor IR drop (there being no back EMF when the motor is not turning). Consequently, the SCR turn-off energy very advantageously increases in proportion to the need.

While I have thus described a preferred embodiment of the present invention, many variations will be apparent to those skilled in the art. The foregoing description is accordingly intended to be illustrative only and not limitative of the present invention, and all such variations and modifications as are in accord with the principles described are meant to fall within the scope of the appended claims.

Having thus described my invention I claim:

1. An electric motor speed control comprising an electric motor, variable impedance means in series with the armature circuit of said motor for controlling the armature current in said motor thereby to control the speed and torque of said motor, said variable impedance means comprising a plurality of resistors connected in series with a plurality of silicon controlled rectifiers respectively, each of said series connected resistors and rectifiers being connected in series with said armature circuit and in parallel array with one another, said resistors having successively decreasing parameter values respectively from one side to the other of said parallel array with the resistance in series with a last one of said silicon controlled rectifiers in said array having a parameter value of substantially zero, sequentially operable switch means for coupling an energizing signal to the gate electrode of any selected rectifier in said array for rendering said selected rectifier conductive to effectively place the resistance associated with said selected rectifier in series with said armature circuit, a plurality of capacitors connected respectively from the junction of each series connected resistor and rectifier to the junction of a next adjacent one of said series connected resistors and rectifiers in said array whereby each of said capacitors acquires a charge when a particular one of said rectifiers is rendered conductive and is discharged to turn off said particular rectifier when a next adjacent one of said rectifiers is rendered conductive, a further capacitor having one side thereof connected to the junction between said last one of said silicon controlled rectifiers and its substantially zero value series resistance, a further silicon controlled rectifier in series with said further capacitor between the other side of said capacitor and a power source, said switch means including means operable to energize the gate electrode of said further rectifier substantially coincident with the energization of the gate electrode of said last one of said rectifiers in said array to render said further rectifier conductive thereby to charge said further capacitor concurrent with the conduction of said last one of said rectifiers, and a still further silicon controlled recitifer connected between said other side of said further capacitor and the side of said last one of said rectifiers remote from said one side of said further capacitor, said switch means including means operable to energize the gate electrode of said still further electrode coincident with the energization of the gate electrode of a rectifier preceding said last one of said rectifiers in said array to discharge said further capacitor via said still further rectifier thereby to turn off the last one of said rectifiers in said array.

2. The combination of claim 1 including a resistance in series with said further silicon controlled rectifier for limiting current flow through said further rectifier during charging of said further capacitor, said still further rectifier being connected directly between said further capacitor and said last one of said rectifiers to produce the highest available current flow to said last one of said rectifiers from said further capacitor upon discharge of said further capacitor.

3. The combination of claim 1 wherein said plurality of capacitors are connected respectively between the anodes of the silicon controlled rectifiers in said array, said one side of said further capacitor being connected to the anode of said last one of said rectifiers.

4. The combination of claim 3 wherein the ends of said plurality of resistors remote from said rectifiers in said array are connected together to one side of said armature circuit, the cathodes of the rectifiers in said array being connected together with the cathode of said still further rectifier to the other side of said armature circuit.

5. The combination of claim 4 including a power source between said common cathode connection and the other side of said armature circuit.

6. The combination of claim 1 wherein said switch means comprises a plurality of contacts connected respectively to the gate electrodes of the rectifiers in said array, a switch arm adapted to engage said contacts in sequence, and a source of pulse voltage coupled to said switch arm for energizing a selected one of said gate electrodes.

7. The combination of claim 6 wherein said source of pulse voltage comprises a DC power source connected via a parallel combination of resistance and capacitance to said switch arm.

8. The combination of claim 6 wherein said motor comprises the driving motor of an automotive vehicle, said switch arm being mounted for movement from one to the next of said contacts by a foot-operated vehicle operator's pedal.

9. The combination of claim 1 wherein said switch means comprises first and second pluralities of contacts, first and second switch arms ganged to one another and adapted respectively to engage said first and second pluralities of contacts in sequence, said first plurality of contacts being connected to the gate electrodes of the rectifiers in said array, a pulse type voltage souce connected to said first switch arm for selectively energizing the gate electrodes of said rectifiers in said array, at least one of said second plurality of contacts being connected to the gate electrode of said further silicon controlled rectifier, and a further pulse type voltage source connected to said second switch arm for selectively energizing the gate electrode of said further rectifier.

10. The combination of claim 9 wherein said pulse type voltage sources comprise separate DC power sources connected respectively via RC networks to said first and second switch arms.

11. The combination of claim 9 wherein the contact which is connected to the gate electrode of the rectifier in said array next preceding said last one of said rectifiers is also connected to the gate electrode of said still further rectifier.

12. The combination of claim 9 wherein selected adjacent ones of the contacts in said first plurality of contacts are connected to one another to permit said switch arm to move from one to the next of said interconnected contacts without altering the relative states of energization of said silicon controlled rectifiers.

13. An electric motor speed control comprising an electric motor operative to exhibit a variation in speed in response to a variation in current through a preselected circuit of said motor, a plurality of N current control impedances connected to said motor circuit, said N impedances having parameter values which are respectively scaled from a predetermined maximum value to a predetermined minimum value, a plurality of N silicon controlled rectifiers connected in series with said N impedances respectively, speed control means coupled to the gate electrodes of said N rectifiers for rendering any selected rectifier conductive to effectively couple the impedance in series with the selected rectifier into said motor circuit thereby to control the speed of said motor, a plurality of (N-1) commutating capacitors connected respectively between the anodes of said N rectifiers for turning off any conductive rectifiers, other than the one of said rectifiers in series with said minimum value impedance, when another of said rectifiers is rendered conductive by said speed control means, a further capacitor having one side connected to the anode of said one rectifier and having its other side connected to a controllable charging circuit and to a controllable discharging circuit separate from said charging circuit, means for rendering said charging circuit operative substantially coincident with conduction of said one rectifier to supply a charging current to said further capacitor, said charging circuit being automatically deactivated when said further capacitor has acquired a predetermined charge, and means responsive to subsequent conduction of a selected rectifier other than said one rectifier for rendering said discharging circuit operative to discharge said further capacitor in inverse direction through said one rectifier to turn off said one rectifier.

14. The speed control of claim 13 wherein N is at least 4.

15. The speed control of claim 13 wherein said motor is a DC motor, said motor circuit comprising the armature of said motor.

\* \* \* \* \*